US006571275B1

(12) United States Patent
Dong et al.

(10) Patent No.: US 6,571,275 B1
(45) Date of Patent: May 27, 2003

(54) METHOD AND APPARATUS FOR FILTERING MESSAGES IN A DATA PROCESSING SYSTEM

(75) Inventors: Jianming Dong, Austin, TX (US); John Martin Mullaly, Austin, TX (US); Alan Richard Tannenbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,318

(22) Filed: Apr. 27, 1999

(51) Int. Cl.[7] .............................................. G06F 13/00
(52) U.S. Cl. ...................... 709/209; 709/202; 709/203; 709/204; 713/201
(58) Field of Search ................................. 709/206, 207, 709/208, 209, 202, 203, 204, 100, 200, 201

(56) References Cited

U.S. PATENT DOCUMENTS

| | | | |
|---|---|---|---|
| 5,475,738 A | 12/1995 | Penzias | 379/67 |
| 5,632,002 A | 5/1997 | Hashimoto et al. | 395/2.4 |
| 5,944,786 A | 8/1999 | Quinn | 709/206 |
| 5,948,058 A * | 9/1999 | Kudoh et al. | 705/30 |
| 6,006,087 A * | 12/1999 | Amin | 455/413 |
| 6,052,709 A * | 4/2000 | Paul | 709/202 |
| 6,072,942 A * | 6/2000 | Stockwell et al. | 709/206 |
| 6,092,103 A * | 7/2000 | Pritsch | 370/392 |
| 6,094,477 A | 7/2000 | Nada et al. | 379/93.24 |

OTHER PUBLICATIONS

Domino and Lotus Notes Help, Copyright 2000 Lotus Development Corporation, Mar. 30, 1999, 4 pages.

* cited by examiner

Primary Examiner—Majid Banankhah
(74) Attorney, Agent, or Firm—Duke W. Yee; Leslie A. VanLeeuwen

(57) ABSTRACT

A method and apparatus in a computer for processing messages. A message is received. The message is stored. The message is parsed according to a policy. The message is selectively displayed in a graphical user interface based on the policy, wherein messages failing to meet the policy are undisplayed in the graphical user interface.

22 Claims, 7 Drawing Sheets

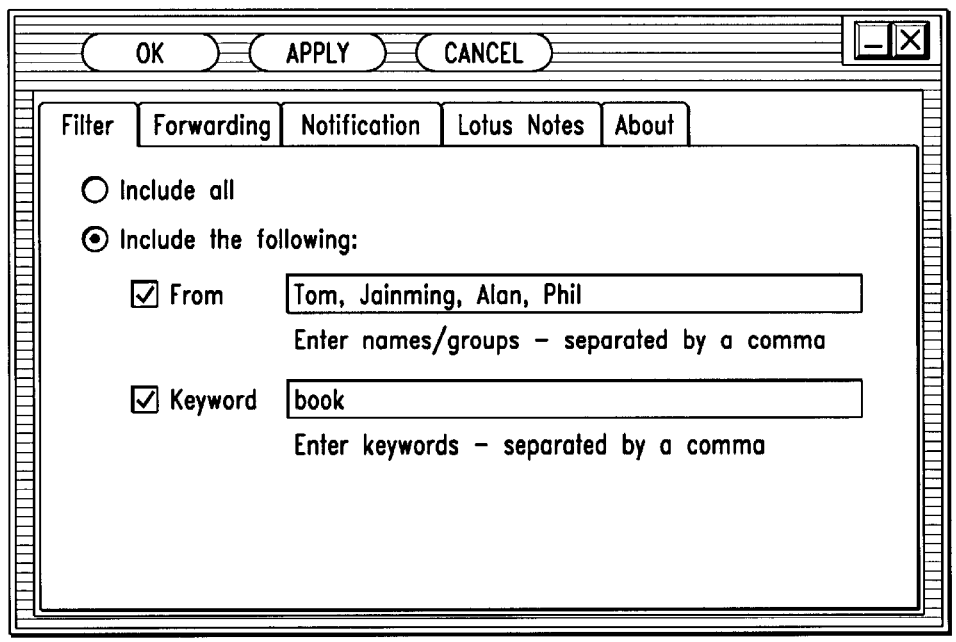
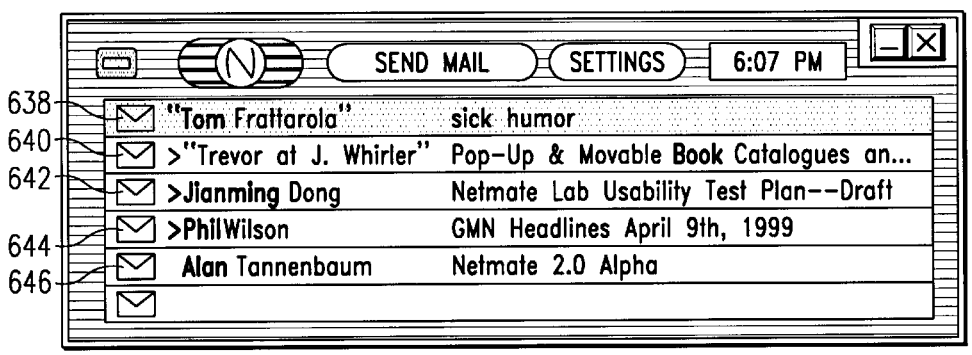
FIG. 6B

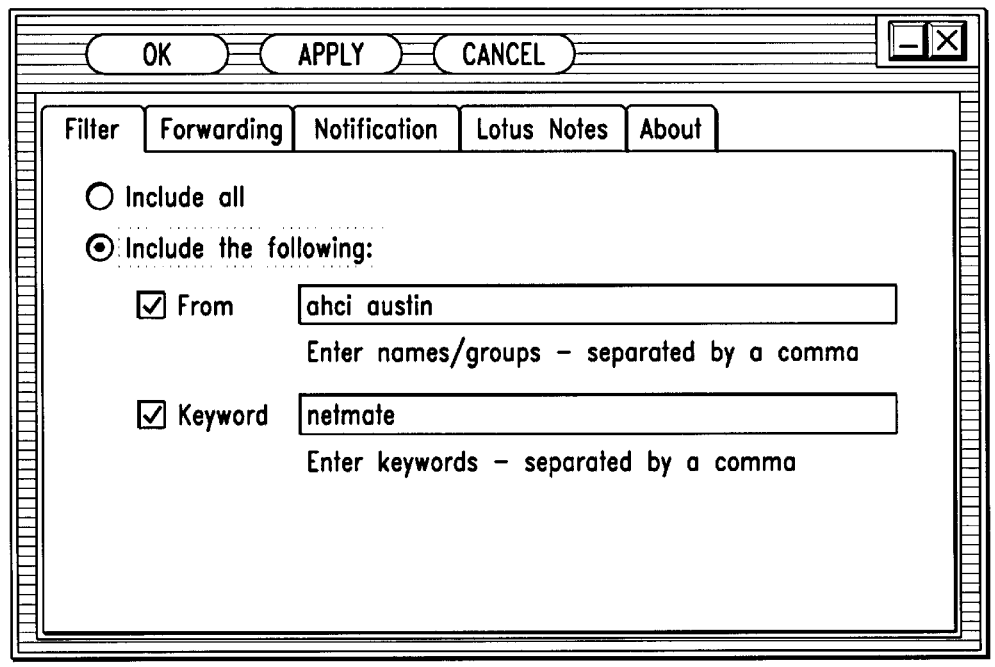
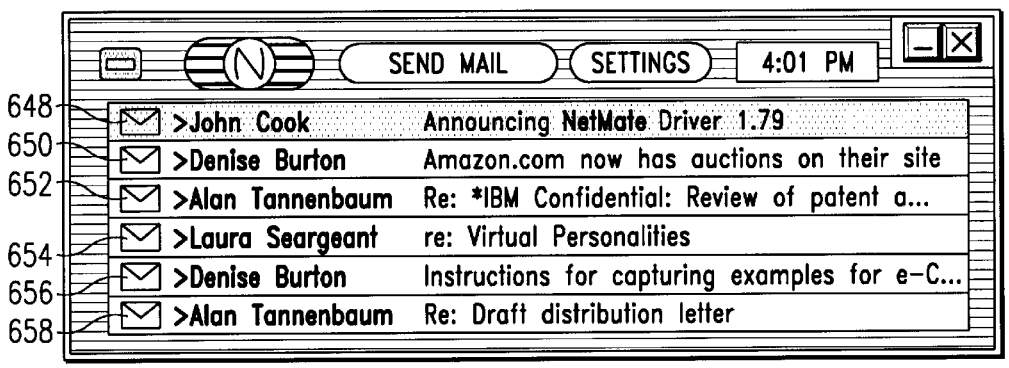
FIG. 6C

METHOD AND APPARATUS FOR FILTERING MESSAGES IN A DATA PROCESSING SYSTEM

CROSS REFERENCE TO RELATED APPLICATIONS

The present invention is related to applications entitled METHOD AND APPARATUS FOR DISPLAYING CONTROLS IN A GRAPHICAL USER INTERFACE, Ser. No. 09/300,32, filed Apr. 27, 1999, A METHOD AND APPARATUS FOR SENDING MESSAGES IN A DATA PROCESSING SYSTEM, Ser. No. 09/300,320, filed Apr. 27, 1999, A METHOD AND APPARATUS FOR SENDING MESSAGES IN A DATA PROCESSING SYSTEM, Ser. No. 09/300,321, filed Apr. 27, 1999, METHOD AND APPARATUS FOR AUTO-EXPANDING AND MANIPULATING DATA FIELDS IN A DATA PROCESSING SYSTEM, Ser. No. 09/300,416, filed Apr. 27, 1999, METHOD AND APPARATUS FOR INTEGRATING ADDRESS BOOKS WITH MOST RECENTLY USED ADDRESS ASSISTANCE, Ser. No. 09/300,317, filed Apr. 27, 1999, and METHOD AND APPARATUS TO ANNOUNCE RECEIPT OF AN ELECTRONIC MESSAGE, Ser. No. 09/300,319, filed Apr. 27, 1999, all of which are filed even date hereof, assigned to the same assignee, and incorporated herein by reference.

BACKGROUND OF THE INVENTION

1. Technical Field

The present invention relates to an improved data processing system and in particular to a method and apparatus for managing electronic messages in a data processing system. Still more particularly, the present invention provides a method and apparatus for a filtering electronic messages in a data processing system.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of information, entertainment, and communications. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

In addition to being a source of information, the Internet also provides a communications medium. The Internet has become the most popular computer network used by consumers and businesses to send and receive electronic mail, also referred to as "e-mail". The Internet allows users to readily send and receive e-mail to and from computers around the world. Each user typically has a unique Internet e-mail address (e.g., steve@ibm.com). A user with an e-mail account and a computer capable of connecting to the Internet can easily send and receive e-mail over the network.

E-mail allows a person to quickly and easily send textual messages and other information, such as, for example, pictures, sound recordings, and formatted documents electronically to other e-mail users anywhere in the world. An e-mail user will typically create a message using an e-mail program running on a computer connected to a computer network through a modem. The message will include an e-mail "address" for the intended recipient. When the user has finished entering the message, the user may "send" the message to the intended recipient. The e-mail program then electronically transmits the message over the computer network. The recipient, using an e-mail program running on the recipient's computer, can then "receive" the message.

The situation involving network based information, especially the large amounts of e-mail sent between various users may present users with "information overload". Often times a user will check the user's mailbox and find a multitude of new e-mail that is arrived since the last time the user checked for e-mail. This situation can result in an important message being ignored or unseen until a later time because the important message has been buried among less important messages. Current e-mail systems provide the use of sound effects or recorded statements. These types of notification, however, fail to provide any detail as to the source of the information or the information contained within the e-mail.

Thus, it would be advantageous to have an improved method and apparatus for filtering electronic messages, such as e-mail messages.

SUMMARY OF THE INVENTION

The present invention provides a method and apparatus in a computer for processing messages. A message is received. The message is stored. The message is parsed according to a policy. The message is selectively displayed in a graphical user interface based on the policy, wherein messages failing to meet the policy are undisplayed in the graphical user interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A–6C are diagrams illustrating displays for modifying filter parameters or properties and the resulting display of messages depicted in accordance with a preferred embodiment of the present invention.

DETAILED DESCRIPTION OF THE PREFERRED EMBODIMENT

Figure 1:
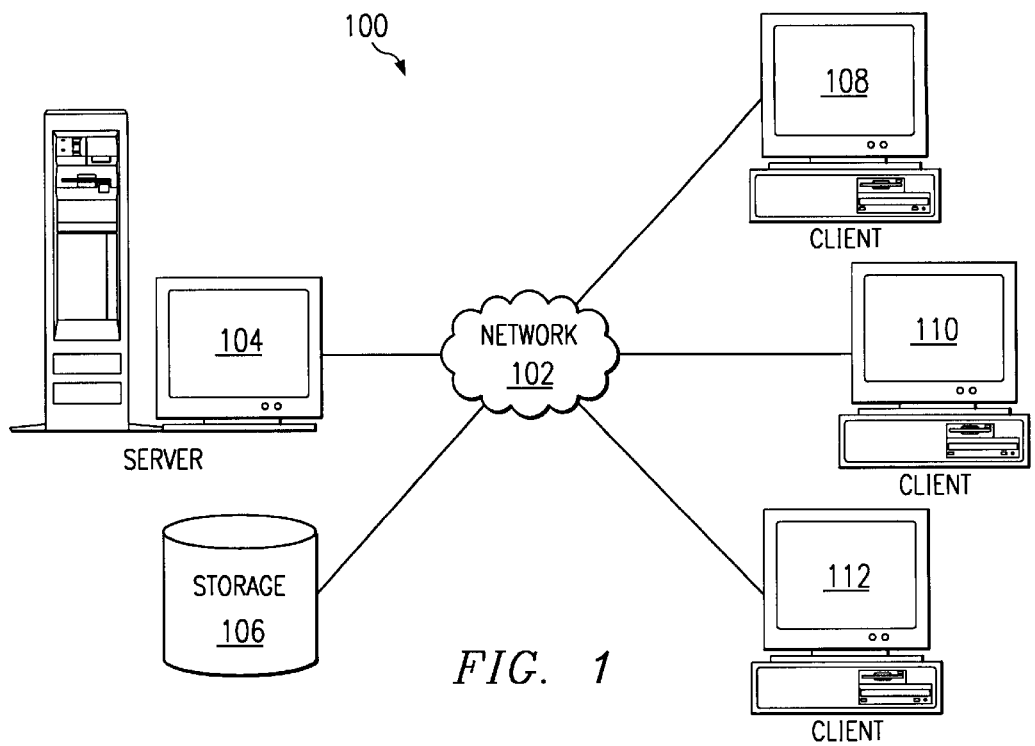
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In the depicted examples, server 104 may contain an electronic mail system from which clients 108, 110, and 112 send and receive e-mail messages.

Distributed data processing system 100 may include additional servers, clients, and other devices not shown. For example, messages may be sent and received between server 104 and other servers (not shown) to distribute and receive messages from other clients (not shown).

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
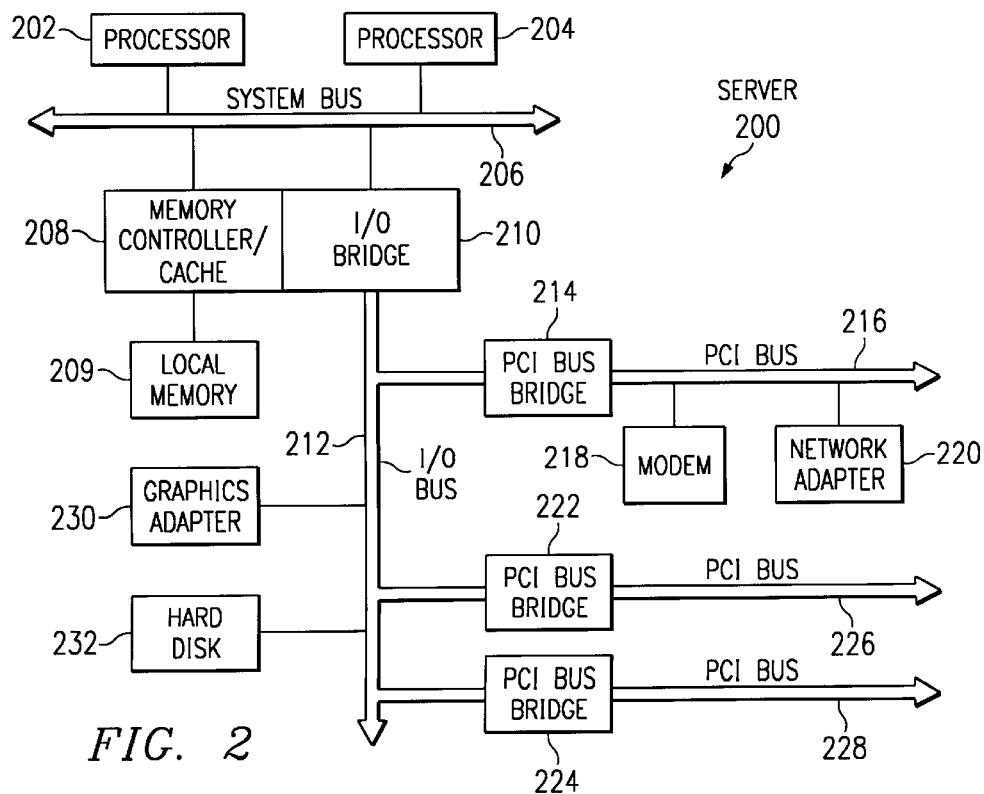
FIG. 2 is a block diagram depicting a data processing system that may be implemented as a server, in accordance with a preferred embodiment of the present invention.

Referring to FIG. 2, a block diagram depicts a data processing system that may be implemented as a server, such as server 104 in FIG. 1, in accordance with a preferred embodiment of the present invention. In the depicted examples, data processing system 200 is used as a electronic mail message server providing service to a number of clients. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
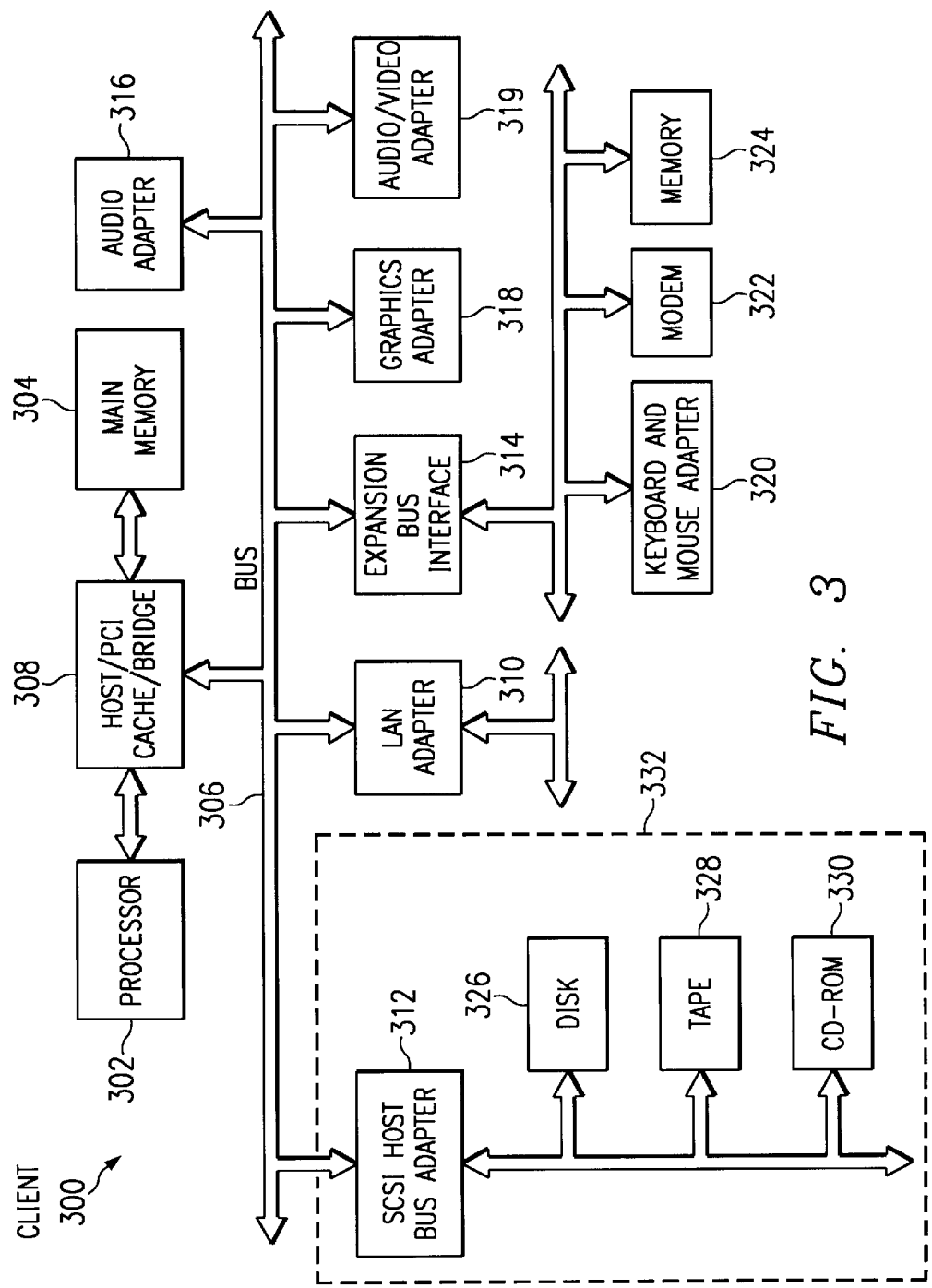
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention provides a method, apparatus, and instructions for an improved message processing system, such as an email message system. Filter of the present invention provides graphical user interface that is easy to use. Further, the filter of the present invention filters both incoming messages as well as messages already received. When changes to filter parameters or criteria are made, the changes are applied to message already received, which may result in a different list of message being presented to the user. Further, the filter of the present invention may use meta-data such as group names in setting the rules of criteria for filtering messages. The criteria or rule that are used in the filter are also referred to as a policy.

Figure 4:
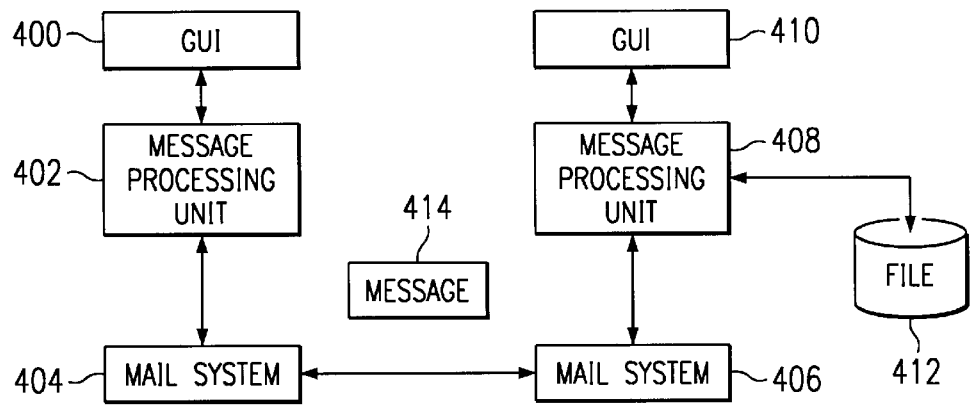
FIG. 4 is a block diagram of a custom messaging system in which a filter of the present invention may be used depicted in accordance with a preferred embodiment of the present invention.

With reference now to FIG. 4, a block diagram of a custom messaging system in which a filter of the present invention may be used is depicted in accordance with a preferred embodiment of the present invention. In this example, a graphical user interface (GUI) 400 is used in combination with a message processing unit 402 to send an electronic message, such as message 414. In this example, message 414 is sent through mail system 404 to mail system 406 for receipt by message processing unit 408, which selectively provides a display of the message in a message list within GUI 410. In accordance with a preferred embodiment of the present invention, a filter is used to process messages for presentation within GUI 410 based on the content of the message. The message, depending on the filter results, is announced or presented by message processing unit 408 to the user through GUI 410 or some other mechanism such as text-to-speech synthesis. Filter settings may be stored within file 412 for use when message processing unit 408 receives a message. If filter settings are changed, these changes are applied to all messages already received as well to new messages received by message processing unit 408.

In this example, GUI 400, message processing unit 402, and mail system 404 may be located at one client while GUI 410, message processing unit 408, and mail system 406 are located at another client in a distributed data processing system. In these examples, mail system 404 and mail system 406 are legacy mail systems while GUI 400, message processing unit 402, GUI 410, and message processing unit 408 implement processes of the present invention. These clients may be implemented using a data processing system, such as data processing system 300 in FIG. 3. Message processing unit 402 and message processing unit 408 process messages created and received by the user through presently available or legacy mail system processes found in mail system 404 and mail system 406. The legacy mail systems may be implemented using currently available mail systems, such as Lotus Notes or CC Mail, which are available from Lotus Development Corporation. Address lists associated with these mail systems may be accessed by the processes of the present invention in message processing unit 402 or 408 using known interfaces supported by the mail system. For example, Vendor Independent Messaging (VIM) is an example of a known interface support by many mail systems that may be used to access address books as well as initiate various functions, including, for example the sending of mail messages and attaching files to mail messages.

The actual storage and transmission of e-mail, including customized content, is implemented using conventional e-mail data formats and protocols. The separation of these functions is shown for purposes of clearly illustrating the present invention. Of course, depending on the implementation, the processes of the present invention may be implemented directly within a mail system.

Figure 5:
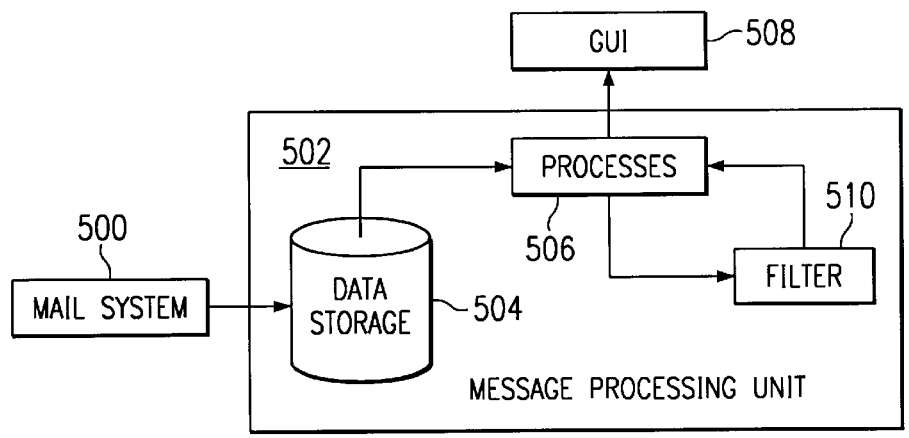
FIG. 5 is a block diagram of components used in filtering messages depicted in accordance with a preferred embodiment of the present invention.

With reference now to FIG. 5, a block diagram of components used in filtering messages is depicted in accordance with the preferred embodiment of the present invention. In this example, mail server 500 receives messages. Message processing unit 502 periodically retrieves messages from the mail server 500 for storage within data storage 504. The messages are processed by processes 506 to identify which messages should be displayed within GUI 508. Normally, all of the messages received by message processing unit 502 would be displayed on GUI 508 by processes 506. In accordance with the preferred embodiment of the present invention, the messages stored within data storage 504 are filtered using filter 510 to identify messages that will be displayed on GUI 508 in accordance with the preferred embodiment of the present invention. As a result, not all messages received by message processing unit 502 will be displayed on GUI 508. In some cases, no messages received by message processing unit 502 will be displayed on GUI 508 depending on the results of filtering the messages using filter 510.

Further, in accordance with the preferred embodiment of the present invention, changes to criteria or other filtering properties of filter 510 will result in processes 506 re-filtering the messages stored within data storage 504 to re-identify messages stored in data storage 504 for display on GUI 508. When filtering properties are changed within filter 510, different messages may be displayed or presented to the user than those originally displayed on GUI 508. Moreover, the messages may be presented to a user other than visually. For example, processes 506 could also initiate an audio presentation of the message in response to identifying the messages to be presented to the user after filtering using filter 510.

Figure 6A:
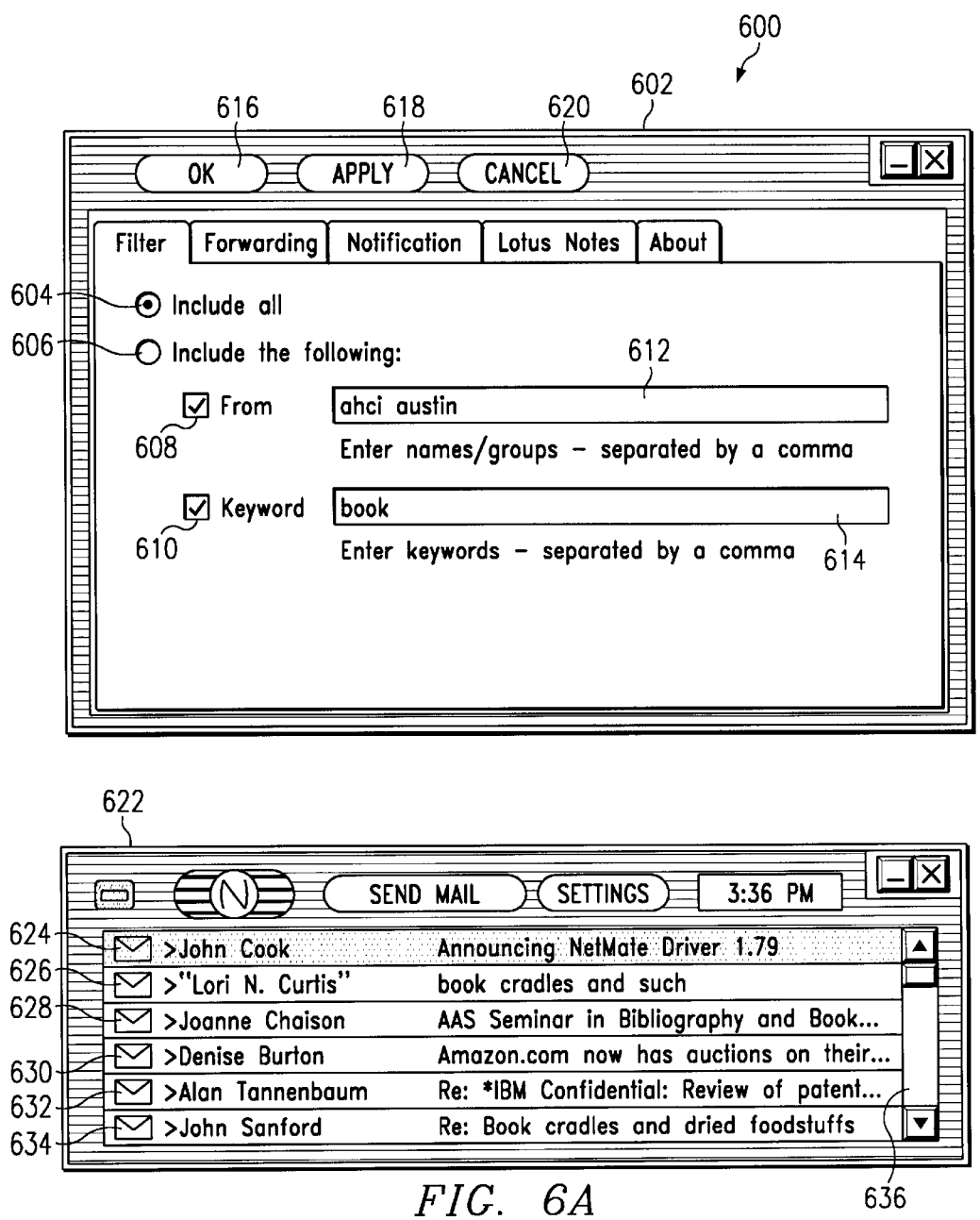

With reference now to FIGS. 6A–6C, diagrams illustrating displays for modifying filter parameters or properties and the resulting display of messages are depicted in accordance with the preferred embodiment of the present invention.

In FIG. 6A, display 600 includes a GUI 602, which displays various filter criteria and parameters that may be changed in accordance with a preferred embodiment of the present invention. In this example, the user may select to include all messages by selecting selection 604. Selection of selection 606 allows the user to selectively include various messages. For example, filtering various data from portion of a message may be set by selecting box 608 and entering text within field 612. Selection of key words within the message may be used to filter messages by selecting box 610 and entering the keyword in field 614. In this example, selection 604 has been made to include all messages.

Selections 604 and 606 and boxes 608 and 610 are the rules applied in filtering, while fields 612 and 614 provide for parameters. Selections 604 and 606 are rules, while boxes 608 and 610 are attributes of messages, on which to filter. Fields 612 and 614 are values for the attributes on which to filter. In these examples, if the user is satisfied with the filter settings or properties, "okay" button 616 may be used to exit GUI 602 and store the filter settings and properties. If the user desires to see the effect of the changes without saving them, the user may select "apply" button 618. If the user does not want to save the changes, the user may select "cancel" button 620, which results in the changes being deleted and the previous settings being restored. In this example, the user has selected selection 604, which includes all messages received by the system. As a result, in this example, GUI 622 is a message list that contains entries 624–634. All of these documents are ones displayed based on the settings in the filter. Additional messages are present but not shown, as can be seen by the state of scroll bar 636.

In FIG. 6B, the user has selected selection 606, and has selected to set filtering properties to filter text strings from both the "from" field and from anywhere in the message through selection of boxes 608 and 610. In this example, messages 638–646 are illustrated in response to the filter settings made in GUI 602. Another feature of the present invention is that additional emphasis is provided for various words or strings that meet filter settings or properties. In these examples, the emphasis is provided by bolding the string or text. The words "Tom Jianming", "Allen", and "Phil" were set in field 610. The word "book" was set in field 614. Entry 638 displays "Tom". In entry 640, the word "book" is in bold. In entry 642, the name "Jianming" is in bold. The word "Phil" is in bold in entry 644, while in entry 646, the word "Alan" is in bold.

When the filter is set to include only messages from certain people or certain keywords, the filter applies immediately to the full set of messages in storage. Only those messages meeting the filter criteria are displayed in GUI 622. As new messages are added to the storage, these messages are filtered to determine whether to add them to the display of messages in GUI 622.

In FIG. 6C, the group "ahci austin" is entered as a group in field 610, while the keyword "netmate" is entered in field 614. The resulting displays in GUI 622 are entries 648–658. All of the names are highlighted because they are all part of the group "ahci austin." The word netmate in entry 648 is highlighted because it matches the keyword "netmate" entered in field 614. As can be seen, the filter settings may use meta-values, such as group names from an address book. With this kind of setting or criteria, the filter will then cause the inclusion of all values within the meta-value. Specifically, the present invention allows the use of names to compare against values in the "from" field of a mail message. The present invention allows the use of groups or distribution lists to identify multiple individual names without having to enter those names into the filter itself. By entering a group name or distribution list name into the filter setting, a user may specify that the filter will apply to all names that are in the corresponding group, as stored in an address book or other data structure.

Figure 7:
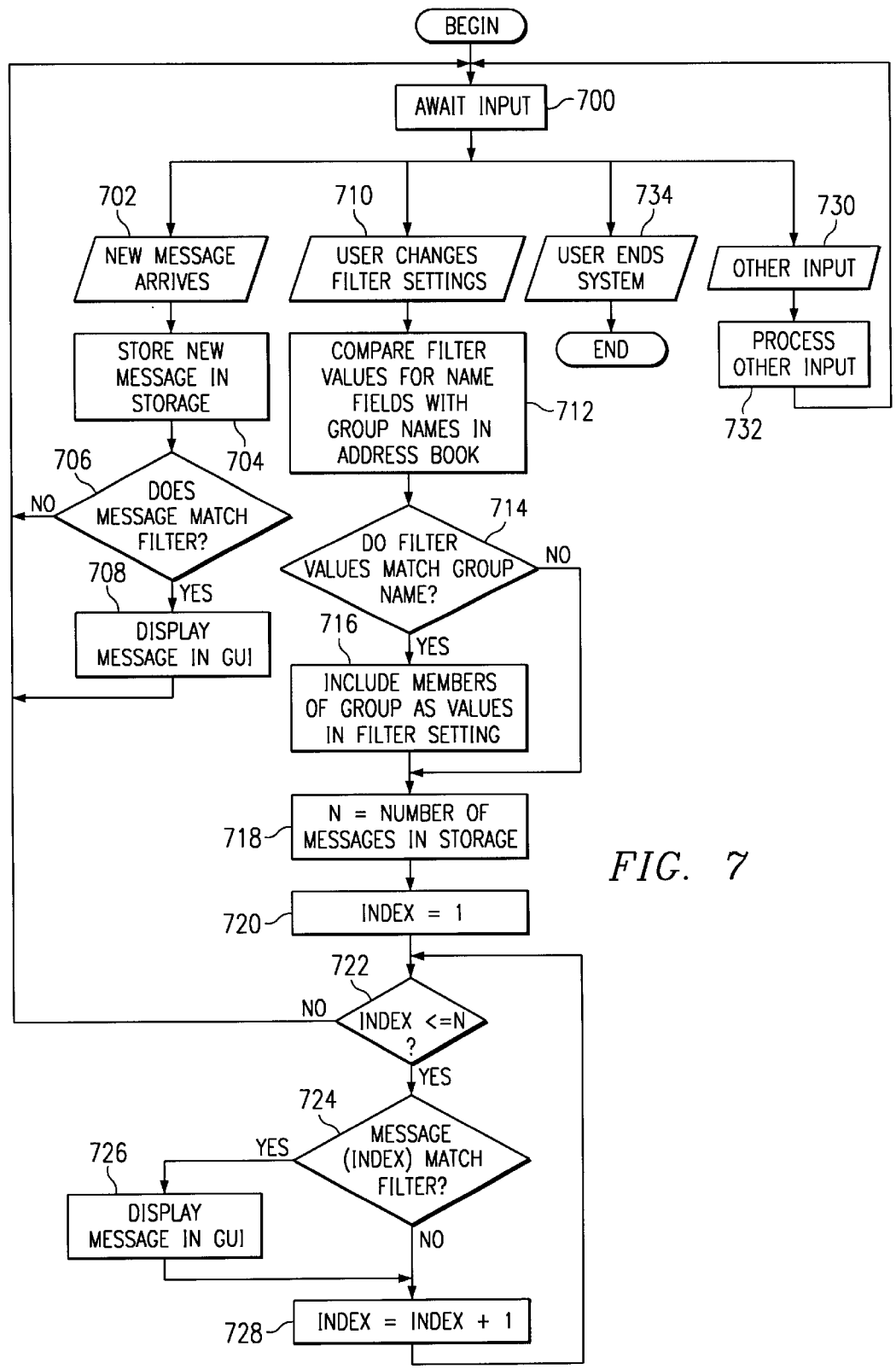
FIG. 7 is a flowchart of a process for handling input to a message processing unit depicted in accordance with a preferred embodiment of the present invention.

With reference now to FIG. 7, a flowchart of a process for handling input to a message processing unit is depicted in accordance with a preferred embodiment of the present invention. The process begins by awaiting user input (step 700). Responsive to the input being the arrival of a new message (step 702), the new message is stored in a storage device (step 704). Thereafter, determination is made as to whether the message matches the filter (step 706). If the message does not match the filter, the process returns to step 700 to await additional input. Otherwise, the message is displayed in the GUI (step 708) with the process then returning to step 700 to await additional input.

Responsive to input being a user changing filter settings (step 710), the process compares filter values for name fields with group names in an address book (step 712). A determination is made as to whether the filter value matches the group name (step 714). If the filter value matches the group name, the members of the group are included as values in the filter settings (step 716). When a group name is present, the processes of the present invention may retrieve all of the names from the address book or other data structure to use as values in the filter settings. As a result, all of the names associated with a group name or distribution list will be used as criteria to determine which messages are to be presented to the user. Thereafter, a variable N is set equal to the number of messages located in the storage device (step 718).

With reference again to step 714, if the filter value does not match the group name, the process proceeds directly to step 718. Thereafter, an index is set equal to one (step 720). A determination is then made as to whether the index is less than or equal to N (step 722). If the index is less than or equal to N, a determination is then made as to whether the message identified by the index value matches the filter (step 724). If the message does match the filter, then the message is displayed in the GUI (step 726) with the process then incrementing the index by one (step 728) and then returning to step 722 to determine whether the index is less than or equal to N.

With reference again to step 724, if the message referenced by the index value does not match the filter, the process proceeds to step 728 directly. Turning back to step 722, if the index is not less than or equal to N, the process then returns to step 700 to await further input.

If the received input is other input (step 730), that input is processed (step 732) with the process then returning to step 700. This other input may include, for example, opening, sending, and deleting messages. When messages are deleted, these messages are removed from the data store. In response to user input ending the system (step 734), the process will terminate.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although, the depicted examples are directed mainly for the processing of e-mail messages, the processes of the present invention may be applied to other kinds of messages, such as, for example, without limitation, electronic phone messages and bulletins. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a client data processing system for processing messages, the method comprising the data processing system implemented steps of:

receiving a message;

storing the message in a storage device;

parsing the message according to a policy;

selectively displaying the message in a graphical user interface based on the policy, wherein messages failing to meet the policy are undisplayed in the graphical user interface and remain stored in the storage device; and responsive to a change in the policy in which a prior undisplayed message in the storage device now meets the policy, displaying the prior undisplayed message in the graphical user interface.

2. The method of claim 1, wherein the message is an e-mail message.

3. The method of claim 1, wherein the message is a phone message.

4. The method of claim 1, wherein the policy selects messages based on a selected sender.

5. The method of claim 1, wherein the policy selects messages containing a keyword in the message.

6. A method in a client data processing system for processing messages, the method comprising the data processing system implemented steps of:

receiving a message;

storing the message in a storage device, wherein the storage device stores received messages;

filtering the message using filter parameters, wherein messages meeting the filter parameters are passed by the filter;

responsive to the message being passed by the filter, presenting the message to a user, wherein only messages passed by the filter are presented to the user and wherein the unpresented messages remain stored in the storage device; and responsive to a change in the filter parameters in which a prior unpresented message in the storage device now matches the filter parameters, presenting the prior unpresented message to the user.

7. The method of claim 6, wherein the filter parameters pass messages from a selected sender.

8. The method of claim 6, wherein the filter parameters pass messages containing a selected keyword.

9. The method of claim 6, wherein the message is presented in at least one of a visual presentation and a audio presentation.

10. A message processing mechanism for use in a client data processing system for processing messages received by the client data processing system, the message processing mechanism comprising a plurality of modes of operation:

a first mode of operation in which the message processing mechanism waits for a message;

a second mode of operation, responsive to receiving a message in the first mode of operation, in which the message processing mechanism parses the message;

a third mode of operation, responsive to parsing the message in the second mode of operation, in which the message processing mechanism determines whether selected content is present in the message;

a fourth mode of operation, responsive to selected content being present in the message, in which the message processing mechanism initiates a display of the message in a graphical user interface;

a fifth mode of operation, responsive to new selected content, in which the message processing mechanism parses all stored messages;

a sixth mode of operation, responsive to parsing all the messages, in which the message processing mechanism determines whether the new selected content is present in the stored messages; and a seventh mode of operation, responsive to a stored message containing the new selected content, in which the message processing mechanism initiates a display of the stored message in the graphical user interface.

11. The message processing mechanism of claim 10 further comprising:

an eighth mode of operation, responsive to a determination that the new selected content is absent from a stored message, in which the message processing mechanism prevents the stored message from being displayed by the graphical user interface.

12. The message processing mechanism of claim 11, wherein in the eighth mode of operation the stored message was displayed in the graphical user interface prior to parsing the stored messages using the new selected content and wherein the message processing mechanism removes the stored message from the display in the graphical user interface.

13. A client data processing system for processing messages, the data processing system comprising:

receiving means for receiving a message;

storing means for storing the message in a storage device;

parsing means for parsing the message according to a policy;

first displaying means for selectively displaying the message in a graphical user interface based on the policy, wherein messages failing to meet the policy are undisplayed in the graphical user interface and remain stored in the storage device; and second displaying means, responsive to a change in the policy in which a prior undisplayed message in the storage device now meets the policy, for displaying the prior undisplayed message in the graphical user interface.

14. The data processing system of claim 13, wherein the message is an e-mail message.

15. The data processing system of claim 13, wherein the message is a phone message.

16. The data processing system of claim 13, wherein the policy selects messages based on a selected sender.

17. The data processing system of claim 13, wherein the policy selects messages containing a keyword in the message.

18. A client data processing system for processing messages, the data processing system comprising:

receiving means for receiving a message;

storing means for storing the message in a storage device, wherein the storage device stores received messages;

filtering means for filtering messages using filter parameters, wherein messages meeting the filter parameters are passed by the filter;

first displaying means, responsive to the message being passed by the filter, for presenting the message to a user, wherein only messages passed by the filter are presented to the user and wherein the unpresented messages remain stored in the storage device; and second displaying means, responsive to a change in the filter parameters in which a prior unpresented message in the storage device now matches the filter parameters, for presenting the prior unpresented message to the user.

19. The data processing system of claim 18, wherein the filter parameters pass messages from a selected sender.

20. The data processing system of claim 18, wherein the filter parameters pass messages containing a selected keyword.

21. A computer program product in a computer readable medium for processing messages in a client, the computer program product comprising:

first instructions for receiving a message;

second instructions for storing the message in a storage device;

third instructions for parsing the message according to a policy;

fourth instructions for selectively displaying the message in a graphical user interface based on the policy, wherein messages failing to meet the policy are undisplayed in the graphical user interface and remain stored in the storage device; and fifth instructions, responsive to a change in the policy in which a prior undisplayed message in the storage device now meets the policy, displaying the prior undisplayed message in the graphical user interface.

22. A computer program product in a computer readable medium for processing messages in a client, the computer program product comprising:

first instructions for receiving a message;

second instructions for storing the message in a storage device, wherein the storage device stores received messages;

third instructions for filtering messages using filter parameters, wherein messages meeting the filter parameters are passed by the filter;

fourth instructions, responsive to the message being passed by the filter, for presenting the message to a user, wherein only messages passed by the filter are presented to the user and wherein the unpresented messages remain stored in the storage device; and fifth instructions, responsive to a change in the filter parameters in which a prior unpresented message in the storage device now matches the filter parameters, presenting the prior unpresented message to the user.

* * * * *

UNITED STATES PATENT AND TRADEMARK OFFICE
CERTIFICATE OF CORRECTION

PATENT NO.   : 6,571,275 B1
DATED        : May 27, 2003
INVENTOR(S)  : Dong et al.

It is certified that error appears in the above-identified patent and that said Letters Patent is hereby corrected as shown below:

Column 1,
Line 11, delete "09/300,32" and insert -- 09/300,322 --.

Signed and Sealed this

Fourth Day of November, 2003

JAMES E. ROGAN
*Director of the United States Patent and Trademark Office*